(12) United States Patent
Biswas et al.

(10) Patent No.: US 11,144,654 B2
(45) Date of Patent: Oct. 12, 2021

(54) ENVIRONMENT-AWARE STORAGE DRIVE WITH EXPANDABLE SECURITY POLICIES

(71) Applicant: Seagate Technology LLC, Cupertino, CA (US)

(72) Inventors: Saheb Biswas, Boulder, CO (US); Kevin Gautam Sternberg, Longmont, CO (US); David Michael Seesdorf, Broomfield, CO (US); Timothy John Courtney, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 320 days.

(21) Appl. No.: 16/296,800

(22) Filed: Mar. 8, 2019

(65) Prior Publication Data
US 2020/0285760 A1 Sep. 10, 2020

(51) Int. Cl.
| | |
|---|---|
| *G06F 21/60* | (2013.01) |
| *H04L 29/06* | (2006.01) |
| *G06F 16/23* | (2019.01) |
| *H04L 9/32* | (2006.01) |
| *G06F 21/64* | (2013.01) |

(52) U.S. Cl.
CPC ........ *G06F 21/604* (2013.01); *G06F 16/2365* (2019.01); *H04L 9/3249* (2013.01); *H04L 63/123* (2013.01); *G06F 2221/2111* (2013.01); *H04L 2209/38* (2013.01)

(58) Field of Classification Search
CPC ............... G06F 21/604; G06F 16/2365; G06F 2221/2111; G06F 21/64; H04L 63/123; H04L 9/3249; H04L 2209/38; H04L 63/107; H04L 9/3239
See application file for complete search history.

(56) References Cited

U.S. PATENT DOCUMENTS

| | | | | |
|---|---|---|---|---|
| 8,560,785 | B1 * | 10/2013 | Malhotra | G06F 21/6218 711/162 |
| 9,560,026 | B1 * | 1/2017 | Worsley | H04L 63/107 |
| 9,813,285 | B1 * | 11/2017 | McGovern | G06F 21/316 |
| 2002/0124067 | A1 * | 9/2002 | Parupudi | H04L 63/102 709/223 |
| 2004/0123150 | A1 * | 6/2004 | Wright | H04L 63/107 726/1 |

(Continued)

*Primary Examiner* — Darren B Schwartz
(74) *Attorney, Agent, or Firm* — Mueting Raasch Group

(57) ABSTRACT

A system includes an environment-aware storage drive comprising one or more storage medium with a location-based service wherein the environment-aware storage drive generates a signal containing information about a location of the storage drive relative to a geo-fenced area and updates a ledger unit of an event happening to the storage drive based on the signal, wherein the event is related to the current environment of the storage drive. The ledger unit keeps track of a number of events and/or data received from the environment-aware storage drive. A policy unit determines an expandable set of security policies for the storage drive triggered by the event and/or data, wherein the security policies specify access restrictions to the environment-aware storage drive based on its current environment. The policy unit transmits and enforces the set of security policies on the environment-aware storage drive to prevent data from being theft from the storage drive.

20 Claims, 2 Drawing Sheets

(56) References Cited

U.S. PATENT DOCUMENTS

| | | | | |
|---|---|---|---|---|
| 2004/0193902 A1* | 9/2004 | Vogler | G11B 20/00731 | 713/193 |
| 2008/0004039 A1* | 1/2008 | Ober | G06F 21/305 | 455/456.1 |
| 2012/0159156 A1* | 6/2012 | Barham | G06F 21/604 | 713/156 |
| 2012/0159172 A1* | 6/2012 | Saxena | H04L 63/107 | 713/171 |
| 2012/0203663 A1* | 8/2012 | Sinclair | G06F 21/6254 | 705/26.41 |
| 2013/0232542 A1* | 9/2013 | Cheng | H04L 63/20 | 726/1 |
| 2013/0246465 A1* | 9/2013 | Cambridge | H04W 12/08 | 707/781 |
| 2014/0075493 A1* | 3/2014 | Krishnan | H04L 67/18 | 726/1 |
| 2014/0189784 A1* | 7/2014 | Marino | G06F 21/60 | 726/1 |
| 2015/0302210 A1* | 10/2015 | Cismas | G06F 21/64 | 726/28 |
| 2016/0036956 A1* | 2/2016 | Debates | G06F 16/951 | 455/419 |
| 2016/0055340 A1* | 2/2016 | Sand-Soll | G06F 21/86 | 726/27 |
| 2016/0092685 A1* | 3/2016 | Tse | G06F 21/6218 | 726/1 |
| 2016/0150365 A1* | 5/2016 | Brown | H04W 4/022 | 455/410 |
| 2016/0255097 A1* | 9/2016 | Smith | H04W 12/06 | 726/1 |
| 2016/0285910 A1* | 9/2016 | Galinski | H04L 63/0442 | |
| 2016/0300070 A1* | 10/2016 | Durham | H04L 63/06 | |
| 2017/0046792 A1* | 2/2017 | Haldenby | G06Q 20/405 | |
| 2017/0214717 A1* | 7/2017 | Bush | G05B 19/0426 | |
| 2017/0316222 A1* | 11/2017 | Muhlestein | G06F 21/6218 | |
| 2018/0062848 A1* | 3/2018 | Gorman | H04L 9/3239 | |
| 2020/0034928 A1* | 1/2020 | Lim | G01S 5/0205 | |
| 2020/0044830 A1* | 2/2020 | Gargett | G06F 21/6218 | |
| 2020/0112555 A1* | 4/2020 | Brown | H04L 9/0891 | |

* cited by examiner

ENVIRONMENT-AWARE STORAGE DRIVE WITH EXPANDABLE SECURITY POLICIES

SUMMARY

Provided herein is a system that includes an environment-aware storage drive comprising one or more storage medium with a location-based service wherein the environment-aware storage drive generates a signal containing information about a location of the storage drive relative to a geo-fenced area and updates a ledger unit of an event happening to the storage drive based on the signal, wherein the event is related to the current environment of the storage drive. The ledger unit keeps track of a number of events and/or data received from the environment-aware storage drive. A policy unit determines an expandable set of security policies for the storage drive triggered by the event and/or data, wherein the security policies specify access restrictions to the environment-aware storage drive based on its current environment. The policy unit transmits and enforces the set of security policies on the environment-aware storage drive to prevent data from being theft from the storage drive.

These and other features and advantages will be apparent from a reading of the following detailed description.

DESCRIPTION

Figure 1:
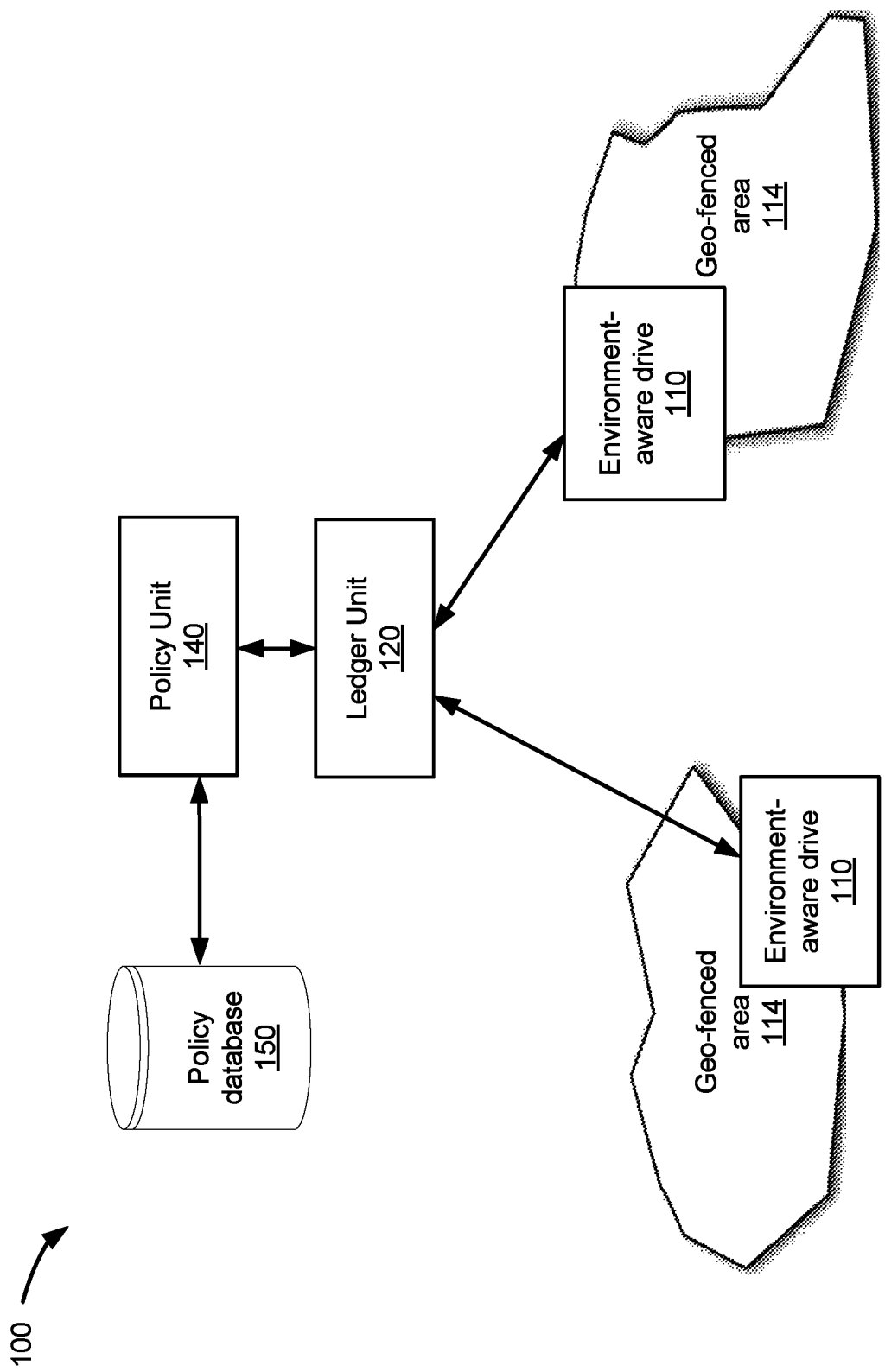
FIG. 1 shows a storage medium system according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media/drive can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Storage medium enterprise systems may be configured by a system administrator. The storage medium enterprise system may include one or more hard drives and/or one or more solid state drives. In order to configure the enterprise the system, the administrator may be asked to provide certain private information, e.g., name, email address, media access control (MAC) address, Internet Protocol (IP) address, etc. Furthermore, the storage medium enterprise may transmit certain operational information associated with the storage medium enterprise system, e.g., debug log files in response to occurrence of an event, debug data, telemetry stream of data in regular intervals, etc. to a processing center, e.g., manufacturer of the storage medium enterprise system. The operational information may include certain data associated with the operation of the storage medium enterprise system, e.g., data indicating that a hard drive is about to fail, data regarding utilization of a hard drive and/or solid state drive, data regarding bandwidth of a hard drive and/or solid state drive, data regarding storage capacity of a hard drive and/or solid state drive, number of reads, number of writes, head failures, drive failure responsive to occurrence of a requested service action, etc.

A geofence is a virtual perimeter for a real-world geographic area (referred to hereinafter as a geo-fenced area) at a given location. The geofence can either be dynamically generated, for a non-limiting example, as a radius around a business location, or be a predefined set of boundaries, such as school attendance zones or neighborhood boundaries. When a device is equipped with a location-based service (LBS), such as a Global Positioning Service (GPS), the device becomes a geofencing/environment-aware device.

A portable environment/geofencing-aware storage drive or drive can be carried around from one location to another, wherein its exact location can be determined via the GPS signal. With growing concerns over data and privacy, different security policies may need to be enforced on environment-aware storage drive depending on its current location and/or environment in order to protect and track the data stored and/or accessed on the storage drive. For a non-limiting example, an environment-aware storage drive can be configured by a security policy to lock itself, making it inaccessible (e.g., block read and/or write access to the drive) in a car, when the car is on rapid acceleration or deceleration or if the storage drive leaves the car. For another non-limiting example, the environment-aware storage drive can be configured by another security policy to be only unlocked and accessible over the internet when the drive is within the range of a wireless router.

Referring now to FIG. 1, a storage medium system 100 according to one aspect of the present embodiments is shown. The system 100 includes an environment-aware storage drive 110 that is carried among different geofenced areas 114, a ledger unit 120, a policy unit 140 and an associated policy database 150.

In the example of FIG. 1, the environment-aware storage drive 110 includes one or more storage medium each can be but are not limited to a hard drive, a solid state drive, and/or any of the computer storage drives discussed above that are configured to store data. In some embodiments, the environment-aware storage drive 110 is equipped with a location-based service (LBS), such as a Global Positioning Service (GPS), running on the storage drive 110 and configured to determine its current location. When the environment-aware storage drive 110 enters or exits a geo-fenced area 114, the environment-aware storage drive 110 is configured to generate and export a GPS signal or packet containing information about the location of the environment-aware storage drive 110. In some embodiments, geographical boundary and type of the geo-fenced area 114 can be user-specified or defined. Each geo-fenced area 114 can be tagged as one of a public area (e.g., at an airport), a private area (e.g., within a company), a third-party area (e.g., a data center), or a restricted place (e.g., a moving vehicle). With the GPS signal, the storage drive 110 becomes aware of its current surrounding/environment based on the geo-fenced area 114 it is currently at. In some embodiments, the GPS signal is signed with a private key, e.g., an RSA key, for authentication purposes. The signed GPS signal can be verified by a recipient with a public key to authenticate that the GPS signal has not been spoofed or contaminated.

In the example of FIG. 1, the ledger unit 120 is configured to maintain/keep track of a number of events based on the signal from the environment-aware storage drive 110. Here, the events or data to be maintained by the ledger unit 120 are related to the current environment of the storage drive 110 and can be but are not limited to the environment-aware storage drive 110 entering or exiting a certain geo-fenced area 114, the environment-aware storage drive 110 starting or stopping to move within a certain geo-fenced area 114, and/or various data collected from the certain geo-fenced area 114. In some embodiments, the types of the events can be defined or specified by a user to those events that would trigger a different set of security policies to be enforced on the environment-aware storage drive 110. In some embodiments, the ledger unit 120 can be located internally within the environment-aware storage drive 110, e.g., in a partition with certain read/write restrictions on the environment-aware storage drive 110. In some embodiments, the ledger unit 120 can be located external to the environment-aware storage drive 110, e.g., at a centralized or distributed server or data center.

During its operation, the environment-aware storage drive 110 is configured to access, interact with and update/report the ledger unit 120 periodically (in regular time intervals) and/or when an event discussed above happens to the storage drive 110. In some embodiments, the ledger unit 120 is configured to provide one or more Application Programming Interfaces (APIs) which the environment-aware storage drive 110 can invoke to access, interact with and log the event to the ledger unit 120. For a non-limiting example, an internet-connected storage drive 110 installed within a vehicle can log data collected from various sensors to the ledger unit 120 over the Internet by invoking the APIs of the ledger unit 120.

In some embodiments, the ledger unit 120 is block chain-enabled for forensic purpose, wherein a block chain is created and utilized to encrypt, distribute, and keep track the events and/or data being transmitted and/or exchanged between the environment-aware storage drive 110 and the ledger unit 120 via the block chain in a secure fashion using cryptography. In some embodiments, the block chain-enabled ledger unit 120 is configured to share data and information with various nodes within a network, e.g., one or more other ledger units, storage drives, and processing entities (e.g., policy units), etc., in a cryptographically secure manner, wherein each of the nodes is allowed to access, and/or decrypt the encrypted data with permission. In some embodiments, new event and/or data may be encrypted and appended to the end of the block chain while preventing prior data within the block chain from being modified. The newly added event and/or data may be propagated to the nodes within the network in order to update the block chain at each node. As such, any data generated or processed, whether public/private, can be tracked by the block chain-enabled ledger unit 120 and cannot be modified without breaking the block chain. In some embodiments, access to the events and/or data can be revoked efficiently if necessary because the events and/or data are tracked using the block chain technology. In some embodiments, the block chain-enabled ledger unit 120 is configured to utilize a hardware root key to instantiate the block chain, wherein the hardware root key is a unique key to the environment-aware storage drive 110.

In the example of FIG. 1, the policy unit 140 is configured to determine an expandable set of security policies for the environment-aware storage drive 110 triggered by the event and/or data logged with the ledger unit 120. Here, the policy unit 140 may either be integrated with the ledger unit 120 in one hardware component or run on a separate component that communicates with the ledger unit 120. In some embodiments, the set of security policies can be retrieved from the policy database 150 by the policy unit 140. In some embodiments, the set of security policies can be defined and specified by the user based on the triggering events. In some embodiments, the set of security policies specify access (e.g., read and/or write) restrictions to the environment-aware storage drive 110, e.g., rules that trigger locking of the storage drive 110, based on its current environment/surroundings to prevent data from being theft from the environment-aware storage drive 110. For non-limiting examples, based on the current environment of the environment-aware storage drive 110, the types of the expandable set of security policies include but are not limited to rules on:

Read and/or write access right to the environment-aware storage drive 110 based on the current environment of the storage drive 110. For a non-limiting example, if the storage drive 110 is in an environment that is vulnerable to attack from external network, write access to the storage drive 110 may be locked. For another non-limiting example, if the storage drive 110 is not connected to internet, it may become unusable/locked.

Data protection strategies ranging from instant secure erase of data stored on the environment-aware storage drive 110 when the storage drive 110 is lost or stolen to none encryption of the data when the storage drive 110 is at a secure location with the entity that owns it.

Type of encryption and/or decryption (e.g., AEC/XES mode) to be used to protect the data stored on the environment-aware storage drive 110. If the encryption (or the lack of thereof) currently used by the environment-aware storage drive 110 is different from the type of encryption required by the policy according to the current environment of the storage drive 110, the type of encryption required by the policy will be enforced on the data of the environment-aware storage drive 110.

Pins and/or keys required for the protection of the environment-aware storage drive 110 based on the current environment of the storage drive (e.g., where the storage drive is). Similar to the type of encryption, different pins and/or keys may need to be used depending on the current environment of the storage drive 110.

Type of authentication required to access the environment-aware storage drive 110 based on the current environment of the storage drive. For a non-limiting example, stricter authentication may be required when the storage drive 110 is in a publicly accessible network vs. when the storage drive 110 is in a private network of the entity owning the storage drive 110.

Permission to download and/or install a firmware to the environment-aware storage drive 110 based on the current environment of the storage drive. For a non-limiting example, download of the firmware to the storage drive 110 may be disabled when the storage drive 110 is in certain environment.

Once the set of security policies are determined, the policy unit 140 is configured to transmit and enforce the set of security policies on the environment-aware storage drive 110 directly or via the ledger unit 120 to prevent data from being theft from the environment-aware storage drive 110. Upon acceptance by the storage drive 110, the set of security policies cause the environment-aware storage drive to re-configure/modify its current settings that are different or inconsistent with the set of security policies. For non-limiting examples, when the storage drive 110 moves from a secure environment to an unsecure environment, certain functionalities may be disabled, read and/or write access right may be locked, and stricter encryption on the data of the storage drive 110 and/or authentication of a user to access the storage drive 110 may be required.

In one non-limiting example, an environment-aware storage drive 110 placed in a network-connected smart car is configured to update an immutable ledger unit 120 located remotely on environmental changes collected by a plurality of sensors in the car. Such environmental data may include but is not limited to heat, humidity, acceleration, deceleration, etc. When one or more of the environmental data/factors exceed certain limits, e.g., the car is too hot, humid, accelerating or decelerating too rapidly for the storage drive 110 to function properly, a new set of security policies is enforced on the storage drive 110, which would cause the storage drive 110 to lock itself from any read or write access to it. In another non-limiting example, when an environment-aware storage drive 110 is taken out of a secure data center, it will log an event with the ledger unit 120. The policy unit 140 may then instruct the storage drive 110 to look for a secure wireless router to connect to in order to receive a token from a host periodically, e.g., every five minutes, for the drive to stay unlocked and accessible. If no secure router can be found, the storage drive 110 will lock itself down according to the security policies from the policy unit 140.

Figure 2:
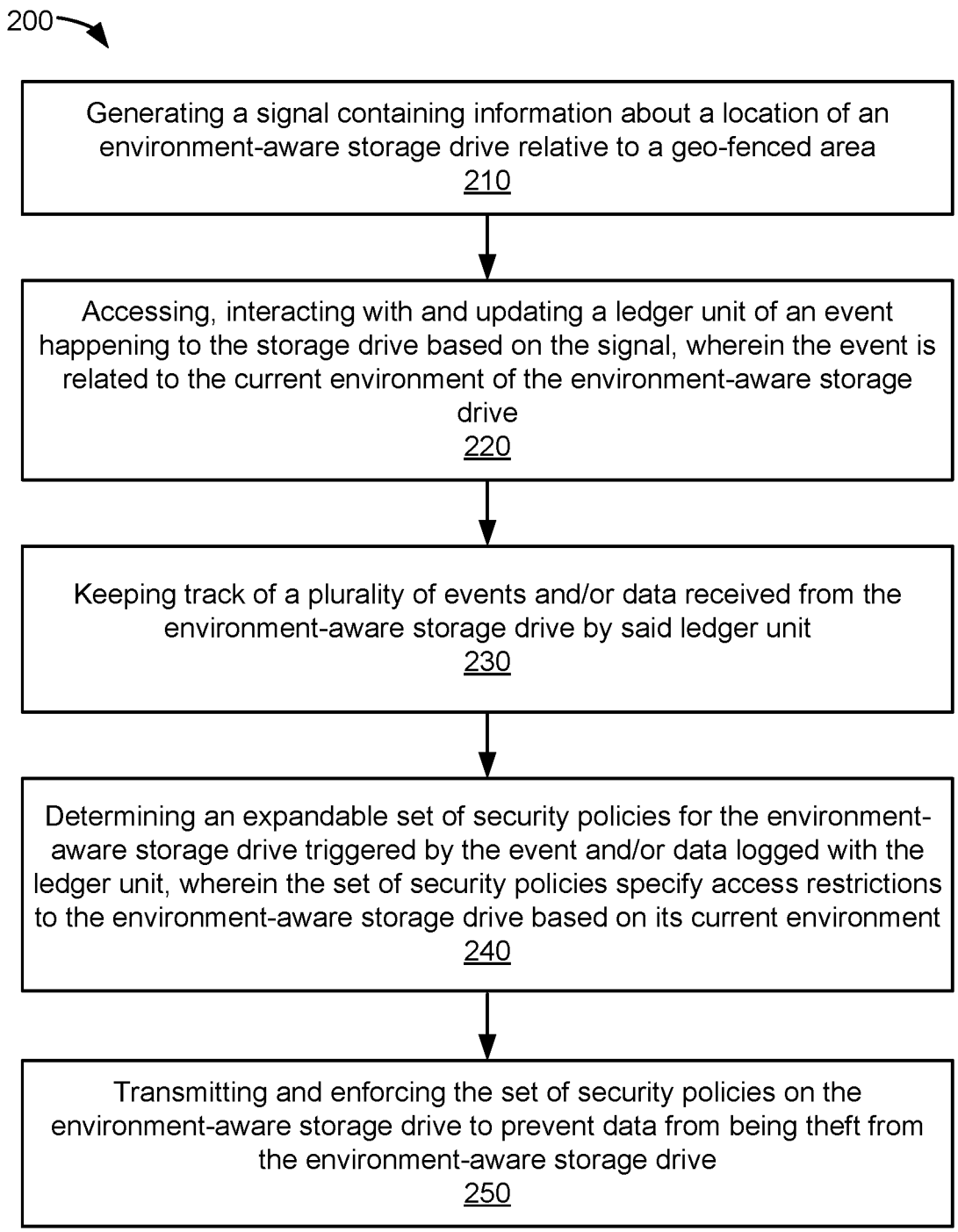
FIG. 2 depicts a flowchart of an example of a process to support environment-aware storage drive with expandable security policies according to one aspect of the present embodiments.

FIG. 2 depicts a flowchart of an example of a process to support environment-aware storage drive with expandable security policies. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, a signal containing information about a location of an environment-aware storage drive relative to a geo-fenced area is generated at step 210. At step 220, the environment-aware storage drive accesses, interacts with and updates a ledger unit of an event happening to the storage drive based on the signal, wherein the event is related to the current environment of the environment-aware storage drive. The ledger unit keeping track of a plurality of events and/or data received from the environment-aware storage drive at step 230. At step 240, a policy unit determines an expandable set of security policies for the environment-aware storage drive triggered by the event and/or data logged with the ledger unit, wherein the set of security policies specify access restrictions to the environment-aware storage drive based on its current environment. At step 250, the set of security policies is transmitted to and enforced on the environment-aware storage drive to prevent data from being theft from the environment-aware storage drive.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
   an environment-aware storage drive comprising a location-based service, the environment-aware storage drive having a storage medium that comprises one or more of a hard disk drive and a solid-state drive, the environment-aware storage drive configured to:
   generate a signal containing information associated with a location of the environment-aware storage drive relative to a given location;
   based on the generated signal, access a block chain-enabled ledger unit with one or more events —associated with the environment-aware storage drive, the one or more events comprising a current location of the environment-aware storage drive; and
   the block chain-enabled ledger unit configured, for forensic purposes, to keep track of the one or more events and associated data received from the environment-aware storage drive; and
   a policy unit configured to:
   determine an expandable set of security policies associated with the environment-aware storage drive, the security policies define when an event is triggered and when associated data with the event is logged with the block chain-enabled ledger unit, the security policies also specify access restrictions to the environment-aware storage drive based on the current location of the environment-aware storage drive; and
   enforce the expandable set of security policies on the environment-aware storage drive, wherein the security policies enforce different types of encryption to encrypt data stored on the storage medium based on a security of the current location.

2. The system as described in claim 1, wherein:
   the given location comprises a geo-fenced area tagged as one of a public area, a private area, a third-party area, and a restricted place.

3. The system as described in claim 1, wherein:
   the signal is signed with a private key for authentication purposes and is verified by a recipient with a public key to authenticate that the signal has not been spoofed or contaminated.

4. The system as described in claim 2, wherein:
   the event includes one or more of the environment-aware storage drive entering or exiting the geo-fenced area, the environment-aware storage drive starting or stopping to move within the geo-fenced area, and various data collected from the geo-fenced area.

5. The system as described in claim 1, wherein:
   the event has a type associated therewith, wherein the type is user definable and where the type triggers a different set of security policies to be enforced on the environment-aware storage drive.

6. The system as described in claim 1, wherein:
   the data includes environmental data associated with the environment-aware storage drive collected by a plurality of sensors, wherein the environmental data comprises acceleration and deceleration of the environment-aware storage drive, and wherein the security policies prevent access to the data stored on the storage medium based on one of the acceleration and the deceleration exceeding a limit.

7. The system as described in claim 6, wherein the environmental data comprises humidity and heat of the environment-aware storage drive, and wherein the security policies prevent access to the data stored on the storage medium based on one of the humidity and the heat exceeding a limit.

8. The system as described in claim 1, wherein the environment-aware storage drive is configured to use an internet connection, wherein the security policies prevent access to the data stored on the storage medium when the internet connection is lost.

9. The system as described in claim 1, wherein:
   the set of security policies includes rules on read or write access to the environment-aware storage drive based on the current location of the environment-aware storage drive.

10. The system as described in claim 1, wherein:
    the set of security policies includes rules on data protection strategies when the environment-aware storage drive is lost or stolen.

11. The system as described in claim 1, wherein:
    the set of security policies includes rules on permission to download and/or install a firmware to the environment-aware storage drive based on the current location of the environment of the storage drive.

12. The system as described in claim 1, wherein:
    the set of security policies cause the environment-aware storage drive to re-configure its current settings that are different or inconsistent with the set of security policies.

13. An environment-aware storage drive having a location-based service the environment-aware storage comprising:
    a storage medium that comprises one or more of a hard disk drive and a solid-state drive;
    a location signal of the environment-aware storage drive generated relative to a geo-fenced area;
    a controller to access and update a block chain-enabled ledger with event occurrences associated with the environment-aware storage drive, the event occurrences associated with a current location of the environment-aware storage drive, the block chain-enabled ledger configured, for forensic purposes, to keep track of a plurality of event occurrences and associated data received from the environment-aware storage drive via a block chain that is utilized to encrypt and distribute the event occurrences and associated data in a secure fashion using cryptography; and
    a policy unit on the controller configured to determine security policies defining when the event occurrence is triggered or when data associated with the event occurrence is logged with the block chain-enabled ledger, and specifying access restrictions to the environment-aware storage drive based on its current location, wherein the security policies enforce different types of encryption to encrypt data stored on the storage medium based on a security of the current location.

14. The environment-aware storage drive as described in claim 13, wherein:
the block chain-enabled ledger is located external to the environment-aware storage drive at a centralized location.

15. The environment-aware storage drive as described in claim 13, wherein:
the block chain-enabled ledger is configured to share data and information with various nodes within a network, in a cryptographically secure manner, each of the nodes allowed to access and decrypt the encrypted data with permission.

16. The environment-aware storage drive as described in claim 13, wherein:
the block chain-enabled ledger is configured to utilize a hardware root key to instantiate the block chain, the hardware root key having a unique key to the environment-aware storage drive.

17. A method comprising:
storing data on a storage medium of environment-aware storage drive, the environment-aware storage drive being at least one of a hard drive and a solid-state drive;
establishing an internet connection with the environment-aware storage drive;
generating a signal associated with a location of the environment-aware storage drive relative to a geo-fenced area;
based on the generated signal, accessing, interacting with, and updating, for forensic purposes, a block chain-enabled ledger unit with events and associated data received from the environment-aware storage drive, the events associated with a current location of the environment-aware storage drive;
tracking a plurality of events or associated data received from the environment-aware storage drive by the ledger unit;
determining an expandable set of security policies associated with the environment-aware storage drive, the expandable set of security policies defining when the event is triggered or when the associated data of the event is logged with the block chain-enabled ledger unit, the security policies specifying access restrictions to the environment-aware storage drive based on the current location of the environment-aware storage drive; and
transmitting and enforcing the expandable set of security policies on the environment-aware storage drive, wherein the security policies prevent access to the data stored on the storage medium when the internet connection is lost.

18. The method as described in claim 17 further comprising:
creating and utilizing a block chain to encrypt, distribute, and track the events or the associated data being exchanged between the environment-aware storage drive and the block chain-enabled ledger unit via the block chain in a secure fashion.

19. The method as described in claim 17 further comprising:
sharing ledger data with various nodes within a network in a cryptographically secure manner, each of the nodes is allowed to access and decrypt the ledger data with permission.

20. The method as described in claim 17, wherein the security policies enforce different types of encryption to encrypt data stored on the storage medium based on a security of the current location.

* * * * *